March 4, 1941.    P. C. ALLEN    2,233,392
BRAKE OPERATING DEVICE
Filed May 9, 1938    2 Sheets-Sheet 1

INVENTOR
PERCY C. ALLEN
BY Alfred R. Fuchs
ATTORNEY

March 4, 1941.   P. C. ALLEN   2,233,392
BRAKE OPERATING DEVICE
Filed May 9, 1938   2 Sheets-Sheet 2

INVENTOR
PERCY C. ALLEN
BY Alfred R. Fuchs
ATTORNEY

Patented Mar. 4, 1941

2,233,392

UNITED STATES PATENT OFFICE 2,233,392

BRAKE OPERATING DEVICE

Percy C. Allen, Kansas City, Mo., assignor of one-half to E. J. Cusic, Slater, Mo.

Application May 9, 1938, Serial No. 206,826

19 Claims. (Cl. 188—110)

My invention relates to brake operating devices, and more particularly to means for operating a vehicle brake, so as to automatically stop the same responsive to a light that is so placed as to stop the vehicle at a desired point.

My apparatus in general, is intended to take the place of, or to supplement, the use of signals utilized for controlling traffic by means of colored lights that are periodically illuminated. My apparatus can be used either in conjunction with such signal lights or in place of such signal lights. The purpose of my invention is to provide means for automatically stopping the vehicle to prevent the same from entering an intersection when the control of the traffic at the intersection is at such a stage that the vehicle that is approaching the intersection from a certain direction is supposed to not enter said intersection.

Among the advantages of my invention are, that it will speed up traffic, because the driver will have confidence in stop signs and signal lights, when the same is used in conjunction with such stop signs and signal lights, and will prevent anyone from entering the intersection that is not supposed to do so. It will furthermore prevent the cutting of corners in making turns, and will prevent a right or left turn whenever the prevention of such turns is desired.

In general, my invention comprises means cooperating with the usual braking mechanism of the vehicle, which will insure full stops of the vehicle before entering the intersection, wherever my apparatus is installed. The apparatus is so constructed and arranged that the stop will be smooth and quick, and the brakes, after being applied, will not be released until a certain interval of time has elapsed, whereupon said brakes will be released and the vehicle can again be driven in a forward direction. My apparatus is so constructed and arranged that the controlling means for the brakes will be put into operation when the ignition switch is turned on, but cannot be turned off immediately with the ignition switch, thus making it impossible to throw the automatic brake controlling means out of operation temporarily in such a manner that it would enable the driver of a vehicle to coast through an intersection that he is not supposed to enter, means being provided for keeping an electrical circuit controlling the operation of the braking means closed for a predetermined interval of time, preferably about three minutes, after the ignition switch has been turned off. The entire apparatus will operate whether the motor of the vehicle is running or not, and all of the apparatus is mounted under the automobile, out of sight and in a manner so that it is not readily accessible for tinkering therewith by the driver of the vehicle to throw the same out of operation.

More specifically my invention comprises means for applying the brakes, comprising brake actuating means in combination with light responsive means for operating the brake actuating means, said brake actuating means being operated in a braking direction upon a predetermined illumination of the light responsive means, and being utilized in cooperation with means for maintaining the brake actuating means in a braking position for a predetermined interval of time, and in cooperation with governor controlled or speed responsive means, whereby the amount of application of the braking means is controlled in accordance with the speed of the vehicle, said governor controlled means operating to release the application of the brakes, should a tendency to skid occur, said light responsive means also operating to release the brakes after a predetermined time interval has elapsed. Any type of light that will throw a beam upwardly from the pavement will operate the device. It can be utilized on streets, at railway grade crossings, at school zones, highway intersections, or at any place where such stop is required or desired. The unit can be installed on all makes of automobiles, street cars, locomotives, and other vehicles.

Other objects and advantages of my invention will appear as the description of the drawings proceeds. I desire to have it understood, however, that I do not intend to limit myself to the particular details shown or described, except as defined in the claims.

Figure 1:
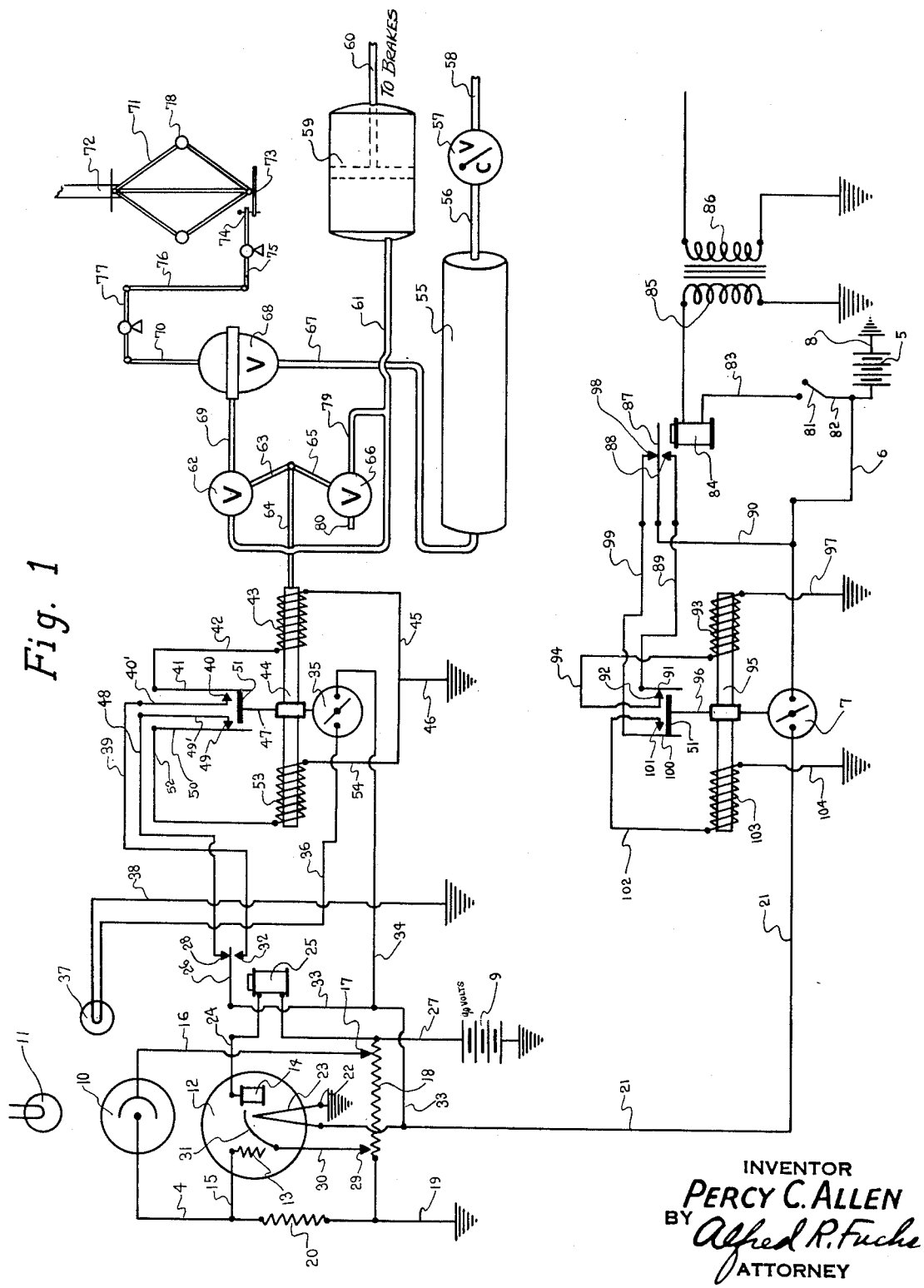
Fig. 1 is a diagrammatic view of the circuit utilized in conjunction with my improved brake operating means, and also showing diagrammatically the mechanical means controlled by the electrical apparatus for actuating the brakes.

Referring in detail to the drawings, my improved brake operating device is shown diagrammatically in Fig. 1 of the drawings, the same comprising a light responsive means 10, which is, preferably, a photo-electric cell, which is adapted to be affected in a manner to apply the brake that is to be operated by means of the same, by the illumination falling thereon from any suitable controlled illuminating means, such as the lamp 11, which may be located at any desired point where the illumination therefrom will be thrown on the photo-electric cell 10 to operate the brake at a desired point in the travel of a vehicle on which the brake is provided. One desirable location for such illuminating means is in the pavement of a street at an intersection, at which the brake is to be applied on a vehicle, such as an automobile, for stopping the same automatically before entering the intersection. It is, of course, to be understood that, while a single lamp is shown and while the illumination from a single lamp will operate to affect the photo-electric cell to operate the brake actuating means, more than one such lamp can be provided, as long as all the lamps illuminate and become de-energized, simultaneously, and, of course, any means for concentrating the illumination from the lamp on a certain spot, or within a certain area, can be provided, if desired.

The electrical energy produced by the photo-electric cell, due to the illumination falling thereon, is amplified to make the same capable of utilization to operate a brake mechanism by means of an amplifying circuit comprising the thermionic amplifier 12, which has a grid 13 and a plate 14. One of the elements of the photo-electric cell 10 is connected by means of the conductor 4 and the conductor 15 with the grid 13, and the other element of the photo-electric cell is connected by means of the conductor 16 with a movable contact member 17 engaging a high resistance 18, the conductor 4 being also connected with a ground connection 19 through a grid leak resistance 20.

The conductor 21 extends from any suitable source of direct current, such as the battery 5, from which the conductor 6 extends to the switch 7, which, when closed, connects the conductor 21 with the conductor 6 and said source of current 5. The other terminal of the battery 5 is connected with the ground connection 8. The conductor 21 extends to the filament 23 of the amplifier 12, the opposite terminal of the filament 23 to that connected with the conductor 21 being connected with the ground at 22. It is, of course, to be understood that, in the case of a vehicle, the ground connection is to some common grounding means, such as the metal frame or metal parts of the vehicle itself. The plate 14 of the amplifier 12 is connected by means of the conductor 24 with one terminal of the winding 25 of an electro-magnet forming part of the relay having an armature 26. The other terminal of said winding is connected with a conductor 27, which is connected with a source of direct current, such as the negative terminal of the battery 9, the other terminal of which is connected with the ground. The armature 26 is normally biased to engage the contact 28. The resistance 18 is interposed between the conductor 27 and the conductor 19 leading to the ground, and a movable contact member 29 engages said resistance 18, said contact member being provided on the conductor 30, which extends from the cathode 31 heated by the filament 23, and said contact being positioned to put the proper negative bias on the cathode 31.

It will be obvious from the above that, when the photo-electric cell 10 is energized to cause a flow of electrical energy therefrom, the amplifying circuit will cause a flow of current through the winding 25 sufficient to attract the armature 26, causing the same to leave the contact 28 and engage the contact 32. A conductor 33 extends from the conductor 21 to the armature 26, and a branch conductor 34 extends from the conductor 33 to a suitable switching device 35, to be described below, and from said switching device extends a conductor 36 to the lamp bulb 37, which is within the range of the photo-electric cell 10, so as to illuminate the same and cause the same to be energized, and from said lamp bulb 37 a conductor 38 extends to a ground connection, as will be evident.

The contact 32 is connected through the conductor 39 with a contact 40, which contact 40 is mounted on a spring 40' and engaged by a movable contact 41, which is made in the form of a spring element and with which the conductor 42 is connected. Said conductor 42 is also connected with one end of a solenoid winding 43, which has an armature 44 in the form of a plunger mounted within the same, the winding 43, when electrical energy flows through the same, tending to pull the plunger 44 to the right in Fig. 1. From the winding 43 a conductor 45 extends to a ground wire 46. A switch operating member 47 is mounted on the plunger 44, so as to move therewith, said switch operating member being connected with the switch 35 in such a manner as to close the same upon movement of the plunger 44 to the right in Fig. 1. The switch 35 is a time switch of such a character that, upon being closed, it will remain closed for a predetermined definite period of time tolled off by the switch, and will open automatically upon the completion of the time interval for which the switch is set, such as that known as the "Mark Time" switch made by M. H. Rhodes Co. of Hartford, Conn., catalog No. 143L.

It will accordingly be seen, that if the switch 7 is closed, whenever the contact 32 is engaged by the armature 26, the switch 35 will be immediately closed and the lamp 37 will be energized for a definite period of time, thus continuing the production of electrical energy by the photo-electrc cell 10 for such a perod, even though the vehicle upon which said cell is mounted may pass beyond the location at which the illumination from the lamp 11 would affect the same. Thus the plunger 44 will remain in the position to which it moved to the right, until the time interval has elapsed that the switch 35 remains closed. Upon reopening of the switch 35, after the time interval has elasped, the electrical lamp 37 will, of course, be de-energized, whereupon the winding 25 will become de-energized, and the armature 26 will be returned to position in contact with the cooperating contact member 28.

Said contact member 28 is connected, by means of the conductor 48, with a contact 49, mounted on a spring 49', and which cooperates with a movable contact member 50, which is made in the form of a spring element. The contact member 41 is, of course, also movable, and both of these are engaged by the cross piece 51 of insulation, mounted on the movable cross member 47 carried by the plunger 44, each in one of the alternate positions of the plunger 44. The plunger 44 is shown in its furthest position toward the right in Fig. 1, at which time the contacts 49 and 50 are in engagement, this being the position of the parts when the switch 7 is closed, and the beam from the lamp 11 has been encountered. The plunger 44 has moved to the right due to the winding 43 being energized and the contact 40 is disengaged by the contact 41 due to the member 51 moving said member 41 to the right. A conductor 52 leads from the movable contact member 50 to the solenoid winding 53, through which the plunger 44 extends, the winding 53 tending to pull the plunger 44 to the left in Fig. 1, when electrical energy flows through the same, until the contact 50 is disengaged from the contact 49. A conductor 54 extends from the winding 53 to the ground wire 46. The position of the parts shown in Fig. 1 are those assumed immediately after the switch 35 has opened due to the time mechanism operating and movement of the plunger 44 from its position furthest to the right back toward its position furthest to the left has begun, but has not yet been started.

After the lamp 37 is de-energized and the armature 26 returns to the position shown in Fig. 1, the winding 53 will have electrical energy flowing through the same, the energy being supplied from the source 5 with which the conductor 21 is connected through the conductors 33, 48 and 52 to said winding 53. The plunger will thereupon be moved to its furthest position to the left and the contact 40 will be engaged by the contact 41, restoring the parts to such a position that upon engagement by the armature 26 of the contact 32, the winding 43 will be energized to again move the plunger 44 to the right.

Any suitable brake mechanism and any suitable brake operating means can be actuated by the movement of the plunger 44. Preferably, a vacuum actuated brake mechanism, operated by means of the movements of the plunger 44, is provided, the same comprising a reservoir 55, which is connected by means of a conduit 56 through a check valve 57 with a suction pipe 58, which may be connected with any suitable suction means, such as the intake manifold of an internal combustion engine. A cylinder 59 is provided, from which the brake operating member 60 extends, which may be connected with any suitable brake mechanism, operated in any desired manner on any desired wheel, or wheels, or parts associated in such a manner with wheels of a vehicle as to apply the brakes thereto, suction created in the cylinder 59 moving the operating member 60 lengthwise of itself to the left in Fig. 1.

A conduit 61 extends from the cylinder 59, which ordinarily has a diaphragm therein that controls the position of the member 60, dependent upon whether there is a condition of atmospheric pressure on the side of the diaphragm remote from the member 60, or whether there is a suction created on that side of the diaphragm, or in other words, a pressure below atmospheric pressure. The conduit 61 extends from a valve 62, which is provided with a lever 63 extending therefrom for operating said valve, said valve being in the open position as shown in Fig. 1, and being actuated by means of the operating member 64, connected with the lever 63, said operating member 64 being fixed to the plunger 44 and moving lengthwise with said plunger. A lever 65, operating the valve 66, is also connected with the operating member 64, said valve 66 being in the closed position, as shown in Fig. 1. A conduit 67 extends from the reservoir 55 through a valve 68, and a conduit 69 extends from said valve 68 to the valve 62, said valve 62 establishing communication between the conduit 61 and the conduit 69 when it is open. Thus, when the valve 62 is opened by movement of the plunger 44 to the right as viewed in Fig. 1, the brake operating member 60 is moved into brake applying position.

The valve member 68 is provided in order to provide for the variations in the application of the brake that will be necessary due to the different speeds at which the vehicle may be traveling when the brake operating means begins its operation. Said valve has an operating member 70, the position of which determines the opening of said valve 68, said member 70 being in the form of a plunger, which moves the valve to a wide open position when in its uppermost position and which causes the valve to assume a position between a fully closed position and a wide open position, depending upon the position of said plunger between its uppermost and lowermost positions. Said plunger is controlled by means of any suitable governor, such as the governor 71, shown diagrammatically in Fig. 1, which governor is shown as being of the usual ball and lazy tongs type, the linkage of the lazy tongs being pivoted to the support 72, and said governor having a finger 73 provided thereon that engages an adjustable pin 74, provided on a lever 75, pivoted to the link 76, which in turn is pivoted to a lever 77, which is pivotally connected with the plunger 70.

It will be obvious that upward movement of the member 73 as the balls 78 of the governor are thrown outwardly by centrifugal force, due to increase in speed of the vehicle, will cause the lever 75 to be rocked, to move the link 76 lengthwise of itself in a downward direction, moving the end of the lever 77, connected therewith, downwardly and the opposite end of the lever 77, connected with the plunger member 70, upwardly to open the valve 68 more widely. Thus the speed of the vehicle controls the effective opening between the conduits 67 and 69 when the valve 62 is open, and the amount of suction created in the cylinder 59, due to the opening of the valve 62, and thus the amount of application of the brakes of the vehicle by means of the operating member 60. The construction of the parts is such that, even if the vehicle is standing still and the governor 71 is not operating at all, the valve operating member 70 will not completely close the valve, said valve 68 being never completely closed, but having only a relatively small opening through the same when the vehicle is standing still, or substantially standing still. This is necessary in order that the brakes will remain set after the vehicle has been stopped. The brakes are released by opening of the valve 66, which has the conduit 79 extending thereto from the conduit 61, and which has a conduit 80 extending from the opposite side thereof to the outer air. The valve 66 is opened upon movement of the plunger 44 to its left position, causing the partial vacuum in the cylinder 59 to be broken, and thus causing the brake operating member 60 to move to brake releasing position.

Means is provided for controlling the switch 7 in such a manner that the circuit through the same will be closed upon closing of the ignition switch of the automobile, on which the device is mounted, and cannot be reopened until a certain period of time after the ignition switch is again opened. This means is provided so that a person cannot open the ignition switch temporarily in an attempt to coast through a controlling device in the form of an illuminating means 11, as above described. The ignition switch 81 is connected with the battery 5 through the conductor 82 and a conductor 83 leads to one end of a winding 84 of a relay, the other end of which is connected with the primary 85 of the transformer, having the secondary 86, which forms part of the ignition circuit of the automobile.

When the relay winding 84 is energized the armature 87 is attracted, causing the armature 87 to engage the contact 88. The contact 88 is connected with the conductor 89 and the armature 87 is connected with the conductor 90. The conductor 89 is connected with a spring contact member 91, with which the spring contact 92 cooperates, said contact 92 being connected with one end of the solenoid winding 93 through the conductor 94, the other end of said winding being connected with the ground through the wire 97. A plunger 95 having a transversely extending member 96 fixed thereto, extends through the winding 93.

The armature 87 is biased in such a direction that it will tend to move toward the contact 98, and when the ignition switch 81 is open, said armature 87 will be in engagement with the contact 98, which is connected through the conductor 99 with a spring contact 100, which is adapted to engage the contact 101, that is connected through the conductor 102 with the solenoid winding 103, which is wound around the plunger 95 in the same direction to the winding 93, and which is connected through the wire 104 with the ground.

The switch 7 is a time switch of such a character that it is closed by movement of the operating member thereof in one direction and remains closed as long as in this position and which also remains closed for a predetermined time interval, after the operating member is moved in the opposite direction, this being due to the time controlled mechanism thereof which is set in operation by movement of the operating member in a direction opposite to closing direction to hold the switch closed for a definite time, after which it is automatically opened, one switch of this type being known as the "Mark Time" switch, catalog No. 140, manufactured by M. H. Rhodes Co., of Hartford, Conn. Movement of the plunger 95 to the right by the energization of winding 93 closes the switch 7 and holds it closed indefinitely. This occurs when ignition switch 81 is closed. Upon the switch 81 being opened the circuit through the winding 103 is completed due to engagement of the contacts 98 and 87 and through contacts 100 and 101, which are then in engagement due to the previous movement of the plunger 95 to the right. The flow of current through the winding 103 moves the plunger 95 to the left and sets the time controlled mechanism of switch 7 in operation, keeping the switch 7 and the circuit closed for a predetermined period of time. Upon such movement of the plunger contacts 100 and 101 are disengaged and contacts 91 and 92 engage, due to movement of bar 51 of insulating material with cross bar 96 and plunger 95.

Figure 2:
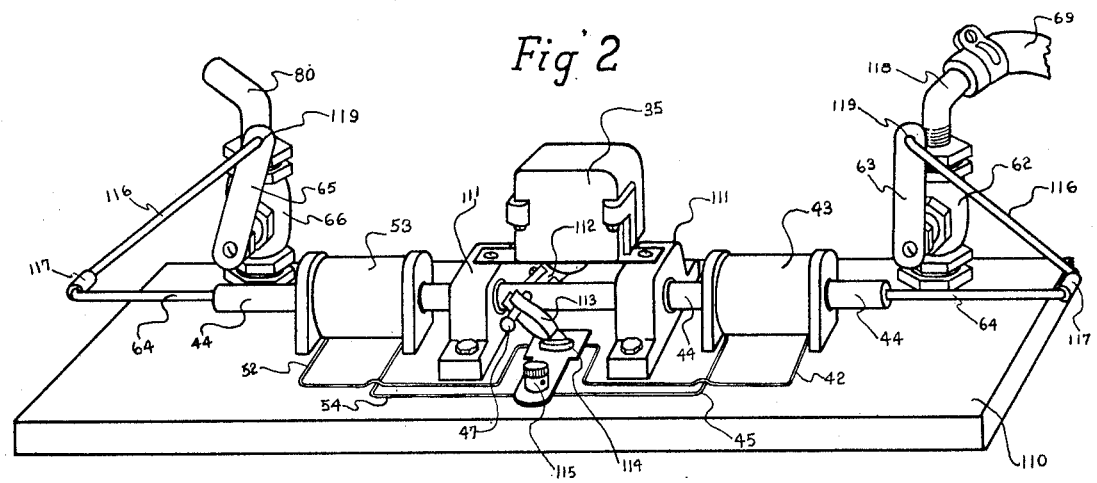
Fig. 2 is a perspective view of the solenoid actuated plunger operated valve operating means.

In Fig. 2 the windings 43 and 53 are shown as being mounted on a base member 110, upon which is mounted a pair of bearing members 111, which act as guide means for the slidable plunger member 44. A transverse headed pin or rod-like member 47 is provided, which is pivotally connected with the lever 112 that extends from the switch mechanism 35 and sets the same, when moved in a counter-clockwise direction, as viewed in Fig. 2, so as to set the time mechanism in operation, as has been previously described.

Engaging the pin 47 is also a clip 113, which extends from the toggle switch member 114, being connected with the operating lever thereof, said toggle switch 114 including the various contacts 40, 41, 49 and 50 of the switch mechanism shown diagrammatically in Fig. 1, so that movement of the toggle lever of the switch in a clockwise direction from that shown in Fig. 2 will cause the contacts 49, 50, 40 and 41 to assume the position shown in Fig. 1. The binding post 115 is for the ground connection corresponding to the connection 46, shown in Fig. 1, the conductors 42, 45, 52 and 54 being connected in the circuit in the same manner as shown in Fig. 1.

Figure 4:
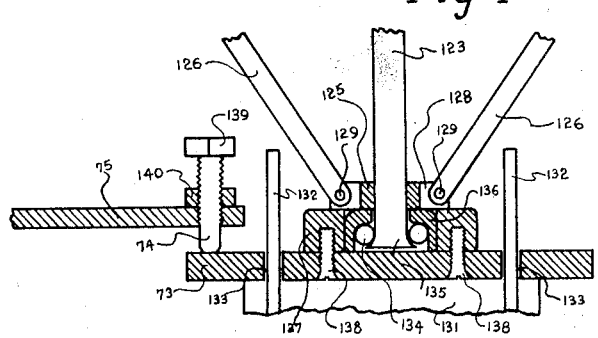
Fig. 4 is a fragmentary sectional view through a portion of the apparatus shown in Fig. 3.

A slightly modified arrangement of valves and operating connections between the valves and the plunger is shown in Fig. 2 from that shown diagrammatically in Fig. 1, a member 64 extending endwise from the plunger 44 in both directions, as shown in Fig. 4, being secured in fixed position to the member 44 in any suitable manner, as by means of a screw-threaded connection. A link 116 is provided between each of the levers 63 and 65, respectively, and operating rod 64, a sleeve-like member 117 being interposed between the members 64 and the members 116, in which the members 64 and one end of each member 116 are swingingly mounted so that the link 116 is adapted to swing relative to the rod 64 as the same moves endwise of itself with the plunger 44.

Figure 3:
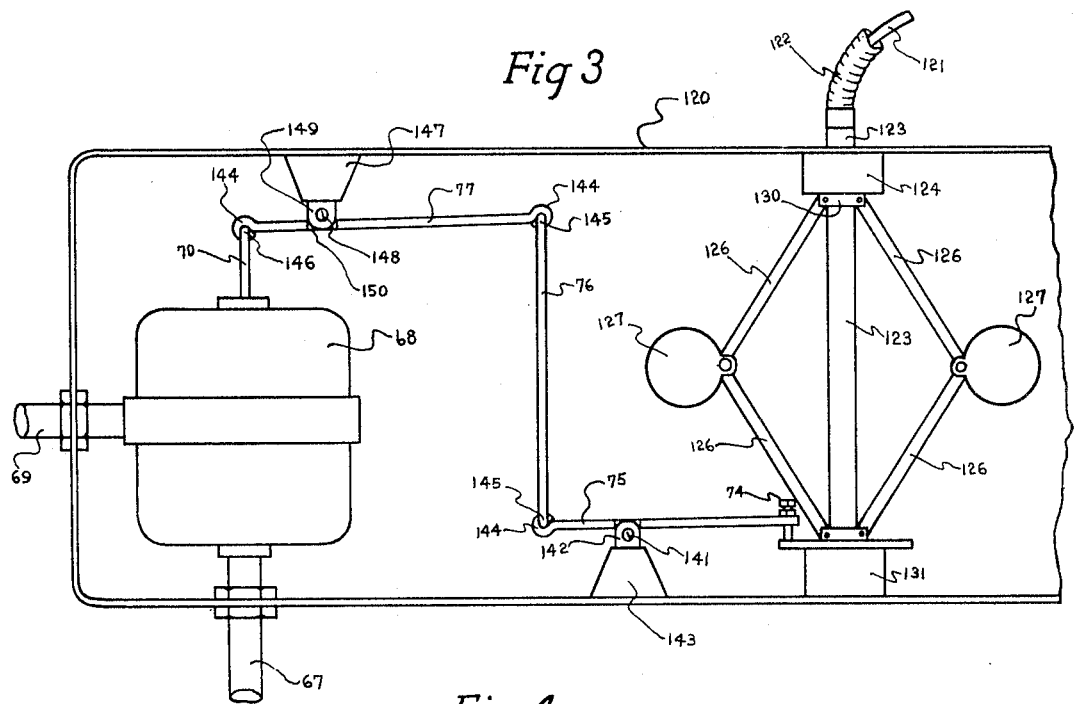
Fig. 3 is a side elevation, with the cover plate removed, of the speed responsive means associated with the brake operating mechanism.

The lever 65 actuates the valve member 66, which is the vacuum braking valve, and has the pipe connection 80 extending to the atmosphere, and the lever 63 actuates the valve 62, which is the brake operating valve and has the pipe connection 118 extending therefrom, which is connected with the hose 69, which corresponds to the conduit 69 shown in Fig. 1, leading to the valve 68, which is shown in Fig. 3 and in Fig. 1. The ends of the links 116 that engage the levers 63 have right angularly bent ends 119 thereon that are mounted in openings in the levers 63 and 65 to pivotally connect said links 116 with said levers.

The governor controlled mechanism is mounted in any suitable housing 120 and has a flexible shaft 121 mounted in a suitable housing 122, extending into the same, said flexible shaft being operatively coupled with the shaft 123 to rotate said shaft with the shaft 121. A bearing member 124 is provided for said shaft 123 at its upper end, and mounted on said shaft is the collar 125 and a collar 130, the collar 125 being shown more in detail in Fig. 4. Said collars 125 and 130 have the links 126 pivoted thereto, which are in turn pivoted to each other, as in a well known form of centrifugal governor, having the weights 127 mounted thereon at the pivotal connection between the same in any well known manner. The links 126 are shown as extending into slots 128 in the collar 125 and as being pivotally connected therewith by pins 129 traversing said slots and fixed in the collar.

A support 131 is provided within the housing 120 and mounted in said support and projecting upwardly therefrom are pins 132 that extend through openings 133 in the disk-like member 73, which corresponds to the member 73 shown in Fig. 1. The member 73 is mounted on the end of the shaft 123 so as to move endwise therewith, but said shaft 123 is rotatable relative to the member 73. Said shaft 123 is mounted for endwise movement and rotation in the bearing 124, and the collar 130 is slidably, but non-rotatably mounted on the member 123 so that said collar 130 will rotate with said shaft 123. The member 125 is fixed on the shaft 123 and an anti-friction bearing comprising the bearing balls 134 rolling between the cone-shaped portion 135 on said shaft 123 and the retainer 136 is provided for the shaft 123, said retainer 136 being mounted in a suitable ring-like member 137 that is fixed to the member 73 by means of the screw-threaded headed members 138. Due to the provision of said anti-friction bearing and the pins 132, the member 73 will move up and down with the end of the shaft 123 as the links 126 move said shaft due to the weights 127 being forced upwardly by centrifugal force, but does not rotate with said shaft 123. The lever 75 has a screw-threaded opening therein, that screw-threadedly receives the threaded portion of the member 74, which is shown as being made similar to a set screw, having a square head 139 adapted to be engaged by a suitable tool for adjusting the position thereof, and being provided with a lock nut 140 to lock the same in adjusted position.

The lever 75 is provided with suitable means for pivotally mounting the same on the pivot member 141, which is mounted in suitable ears 142 extending upwardly from the support 143. Inter-engaging eyes 144 and 145 connect the lever 75 and the link 76, and also the link 76 with the lever 77 so as to provide the pivotal connection between the levers 75 and 77 and said link 76. A similar connection comprising the inter-engaging eyes 144 and 146 pivotally connects the lever 77 with the plunger 70 of the valve 68. The lever 77 is pivotally mounted on a supporting member 147 depending from the top of the casing 120, by means of a pivot pin 148 extending through the ears 149 depending from said support 147, and an ear 150 extending upwardly from the member 77.

When the vehicle is moving forward the ignition switch 81 is, of course, ordinarily closed and the normal position of the switch 7 is such that it is closed to complete the circuit from the battery 5 through the conductor 6 and the conductor 21 to the amplifier 12 and to the conductors 33 and 34. With the vehicle operating in a normal manner, the plunger 95 will be moved to the right from the position shown in Fig. 1 and said switch 7 will be closed and will remain closed as long as said plunger remains in this position, this being the normal condition of the circuit in which the switch 7 is located. At this time the relay 84 will be holding the armature 87 in contact with the contact member 88. The vehicle, as it travels along, will eventually reach a point at which one of the lamps 11 is located. The illumination from the lamp 11 will affect the photo-electric cell 10 when coming in proper range of the same, which will cause a current flow from the cell, which is amplified by the amplifying tube 12 sufficiently to affect the winding 25, so as to attract the armature 26. At this time the switch 35 is in open circuit condition, and the plunger 44 in the position to the left of that shown in Fig. 1. However, when the armature 26 is attracted by the electro-magnet, of which the winding 25 is a part, it will contact the contact member 32, causing current to flow through the conductor 39, the contacts 40 and 41, the conductor 42 and the winding 43, to move the plunger 44 to the right. When the plunger 44 moves to the right the valve 62 is opened and the valve 66 is closed. However, the valve 68 is interposed between the reservoir 55 and the pipe 69, and the extent of opening of the valve 68 will be governed by the position of the member 70, which is controlled by the position of the centrifugal governor, which in turn, is in a position dependent upon the speed that the vehicle is traveling at the time that this movement of the plunger 44 takes place. Accordingly the degree of vacuum created in the cylinder 59 will be dependent upon the position of the valve 68 when the valve 62 is opened, and this will determine the force with which the brake is applied. When the plunger 44 has moved to the right under the influence of the current passing through the winding 43 it causes movement of the member 51 such that the contact between the contact member 40 and the spring contact member 41 is broken and contact is made between the contact member 49 and the spring contact member 50, which is the position shown in Fig. 1. This would tend to immediately return the plunger 44 to the position to the left of that shown in Fig. 1. However, this is prevented due to the lamp 37 being arranged in such a position as to affect the photo-electric cell 10 and when the plunger 44 moves to the position shown in Fig. 1, the member 47 moves along with the plunger, actuating the switch 35 to move the same from open circuit to closed circuit position, thus closing the circuit between the source of current 5 through the conductor 34 and the conductor 36 to the electric lamp 37. The switch 35 remains in this position for a predetermined definite period of time, dependent upon the design and character of the switch, these switches being frequently made so that the same can be adjusted to a desired time interval, during which the switch will remain closed. The time interval during which the switch remains closed is predetermined, so that the electrical energy will not be cut off from the lamp 37 until after the brake has been fully applied for a sufficient interval to stop the vehicle, so that the vehicle would stop, even when the brakes are first applied at high speed. When the time interval has elapsed, the switch 35 operates to open the circuit, the lamp 37 is no longer illuminated and the photo-electric cell 10 will be affected so that the armature 26 will return to the position shown in Fig. 1, which will then cause current to flow through a circuit, including the winding 53, to move the plunger 44 to the left from the position shown in Fig. 1 and this movement will close the valve 62 and open the valve 66, causing the brake to be released. In case the operator of the vehicle purposely opens the switch 81 to interfere with the normal operation of the device as above described, the armature 87 will move to the position shown in Fig. 1, causing the circuit that includes it and the contact 98 from the battery 5 to feed current through the switching members 100 and 101, which will at that time be in contact, as the plunger 95 will be in a position to the right of that shown in Fig. 1, causing the winding 103 to be energized and moving the plunger to the position shown in Fig. 1. When this occurs, the switch 7, which is already closed, will move to a position where the time controlled mechanism will begin operating to hold the switch closed for a predetermined time interval, such that if this opening of the switch 81 occurs when the cell 10 is approaching within the range of the lamp 11, the apparatus will be operated to put on the brakes in the manner above described before the switch 7 will operate to open the circuit to the amplifier 12, the switch 35 and the other apparatus above described as being part of the brake actuating mechanism. Of course, as soon as the switch 81 is again closed, the switch 7 will be moved to a position in which the circuit will be closed, as long as the plunger remains in a position to the right of that shown in Fig. 1, and will not in any way be affected by the time controlled means forming part of said switch 7.

What I claim is:

1. The combination with brake actuating means, of light responsive means for operating said brake actuating means, comprising switching means, means controlling the position of said switching means including a light responsive cell, and means for preventing release of the brake by said actuating means for a predetermined time interval, comprising time controlled means operative to permit release of said brake only after lapse of a time interval subsequent to full application of the brake.

2. The combination with brake actuating means, of light responsive means for operating said brake actuating means in a braking direction upon a predetermined illumination of said light responsive means, and means for maintaining said brake actuating means in a braking position for a predetermined interval of time.

3. The combination with brake actuating means, of electro-magnetic means for operating said brake actuating means both in a braking direction and in a brake releasing direction, and means for controlling the operation of said electro-magnetic means comprising light responsive means.

4. The combination with brake actuating means, of means for operating said brake actuating means successively in a braking direction and in a brake releasing direction, means for controlling said operating means comprising light responsive means and means for maintaining a predetermined time interval between the operation of said brake actuating means in a braking direction and in a brake releasing direction.

5. The combination with brake actuating means, of means for operating said brake actuating means either in a braking direction or a releasing direction, and means out of the control of the operator for setting said operating means either in a braking position or brake releasing position, comprising a controlling circuit for alternately setting said operating means in a braking and a releasing position, comprising light responsive means controlling the condition of said circuit.

6. The combination with brake actuating means, of light responsive means for operating said brake actuating means, and speed responsive means varying the operation of said brake actuating means by said light responsive means.

7. The combination with brake actuating means, of means for operating said brake actuating means in a braking direction upon a predetermined illumination of said light responsive means, speed responsive means cooperating with the said light responsive means to vary the operation of said brake actuating means produced by said light responsive means, and means for maintaining said brake actuating means in a braking position for a predetermined interval of time.

8. The combination with brake actuating means, of means for operating said brake actuating means successively in a braking direction and in a brake releasing direction, means for controlling the operation of said operating means, comprising light responsive means, and speed responsive means for varying the operation of the brake actuating means in a braking direction as produced by said operating means.

9. The combination with brake actuating means, of means for operating said brake actuating means successively in a braking direction and in a brake releasing direction, means for controlling the operation of said operating means, comprising light responsive means, speed responsive means cooperating with said operating means to vary the operation of the brake actuating means in a braking direction as produced by said operating means, and means for maintaining a predetermined time interval between the operation of said brake actuating means in a braking direction and in a brake releasing direction.

10. The combination with brake actuating means, of light responsive means for operating said brake actuating means in a braking direction upon a predetermined illumination of said light responsive means, means for maintaining said brake actuating means in a braking position for a predetermined interval of time and means out of the control of the operator for energizing said light responsive means.

11. The combination with brake actuating means, of electro-magnetic means for operating said brake actuating means both in a braking direction and in a brake releasing direction, means for controlling the operation of said electro-magnetic means, comprising light responsive means, and means out of the control of the operator for energizing said light responsive means.

12. The combination with brake actuating means, of means for operating said brake actuating means successively in a braking direction and in a brake releasing direction, means for controlling said operating means, comprising light responsive means, means for maintaining a predetermined time interval between the operation of said brake actuating means in a braking direction and in a brake releasing direction, and means out of the control of the operator for energizing said light responsive means.

13. The combination with brake actuating means, of light responsive means for operating said brake actuating means, speed responsive means cooperating with said light responsive means to vary the braking action produced by said brake actuating means, and means out of the control of the operator for energizing said light responsive means.

14. The combination with brake actuating means, of light responsive means for operating said brake actuating means in a braking direction upon a predetermined illumination of said light responsive means, speed responsive means cooperating with said light responsive means to control the braking action produced by said operating means, means for maintaining said brake actuating means in a braking position for a predetermined interval of time, and means out of the control of the operator for energizing said light responsive means.

15. In an apparatus of the character described, a light responsive cell, switching means, means for controlling the position of said switching means by means of said cell, a brake operating member, a valve controlling the brake operating member, electro-magnetic means controlling the position of said valve and means for energizing said electro-magnetic means in accordance with the position of said switching means.

16. In an apparatus of the character described, a light responsive cell, an electric lamp within the range of said cell, switching means, means for controlling the position of said switching means by means of said cell, a brake operating member, a valve controlling the brake operating member, electro-magnetic means controlling the position of said drive, means for energizing said electro-magnetic means in accordance with the position of said switching means, and means for energizing said lamp upon movement of said valve to braking position.

17. In an apparatus of the character described, a light responsive cell, an electric lamp within the range of said cell, switching means, means for controlling the position of said switching means by means of said cell, a brake operating member, a valve controlling the brake operating member, electro-magnetic means controlling the position of said valve, means for energizing said electro-magnetic means in accordance with the position of said switching means, and means for energizing said lamp upon movement of said valve to braking position, including switching means opening upon the elapse of a predetermined time interval after the closing thereof by said electro-magnetic means.

18. In an apparatus of the character described, a light responsive cell, switching means, means for controlling the position of said switching means by means of said cell, a brake operating member, vacuum means for actuating said brake operating member, a vacuum reservoir, a valve controlling communication between said vacuum reservoir and vacuum means, electro-magnetic means controlling the position of said valve, means for energizing said electro-magnetic means in accordance with the positoin of said switching means, a second valve between said reservoir and vacuum means, and speed responsive means controlling the position of said second valve.

19. In an apparatus of the character described, a light responsive cell, switching means, means for controlling the position of said switching means by means of said cell, a brake operating member, vacuum means for actuating said brake operating member, a vacuum reservoir, a valve controlling communication between said vacuum reservoir and vacuum means, electro-magnetic means controlling the position of said valve, means for energizing said electro-magnetic means in accordance with the position of said switching means, a second valve between said reservoir and vacuum means, speed responsive means controlling the position of said second valve and a valve for breaking the vacuum in said vacuum means also under the control of said electro-magnetic means.

PERCY C. ALLEN.